J. B. BRADLEY.
HINGE.
APPLICATION FILED JAN. 16, 1920.

1,344,479. Patented June 22, 1920.

WITNESS:
R. A. Thomas

INVENTOR.
J. B. Bradley
BY
Victor J. Evans ATTORNEY.

UNITED STATES PATENT OFFICE.

JOSEPH B. BRADLEY, OF MIAMI, FLORIDA.

HINGE.

1,344,479.

Specification of Letters Patent.  Patented June 22, 1920.

Application filed January 16, 1920. Serial No. 351,765.

*To all whom it may concern:*

Be it known that I, JOSEPH B. BRADLEY, a citizen of the United States, residing at Miami, in the county of Dade and State of Florida, have invented new and useful Improvements in Hinges, of which the following is a specification.

This invention relates to hinges and comprehends certain improvements in the type of hinge disclosed in Patent #1,306,684, issued to me on June 17, 1919.

It is my purpose to provide a hinge of this character wherein the parallel flanges, which embrace the opposite sides of the screen, are separated for a portion of their length from the body of the hinge and then bent to provide stops which facilitate the application of the hinge to the frame of the screen.

The nature and advantages of the invention will be better understood when the following detail description is taken in connection with the accompanying drawings, the invention residing in the construction, combination and arrangement of parts as claimed.

In the drawing forming part of this application, like numerals of reference indicate similar parts in the several views and wherein:—

Figures 1, 2, 3, 4:
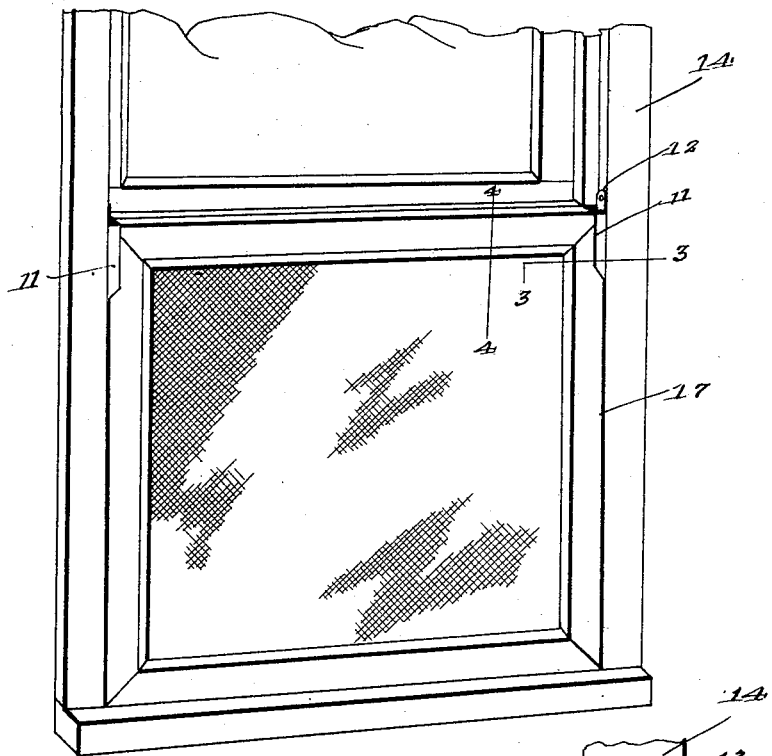
Figure 1 is a perspective view showing a screen hingedly mounted in accordance with my invention upon the window frame.
Fig. 2 is a perspective view of the hinge removed.
Fig. 3 is a horizontal sectional view taken on the line 3—3 of Fig. 1.
Fig. 4 is a vertical sectional view taken on the line 4—4 of Fig. 1.

The hinge forming the subject matter of my invention is formed from a single piece of material of any suitable character, and includes a body portion 10 and parallel flanges 11 which project from the opposite longitudinal edges of the body portion as shown. The body portion is extended above the corresponding ends of the flanges 11 to provide an attaching lip 12 which lies in a plane with the body portion and is provided with an opening 13 to receive a pivot screw or any other suitable fastening element is adapted to be driven into the window frame 14. The body 10 is also provided with spaced openings 15 which can be arranged in alinement or in staggered relation if desired, these openings being adapted to receive fastening elements 16 of any suitable character which are driven into the frame 17 of the screen. The flanges 11 are separated from the body 10 for a portion of their length from the upper ends thereof, and these separated portions are then bent toward each other to provide stop arms 18 to engage the upper rail of the screen when the hinge is in position, the lugs facilitating the application of the hinge to the screen inasmuch as the arms insure the proper positioning of the hinges with respect to the screen frame.

In practice one of the hinge members as illustrated in Fig. 2, is positioned upon the screen frame at the upper corner thereof, the flanges 11 straddling the adjacent vertical edge of the screen frame as shown. The hinge can be associated with the screen in an easy manner as the arms 18 serve to position the hinge upon the screen frame as will be readily understood. When the hinge is in position, the attaching lip extends above the upper rail of the screen frame so as to receive the fastening device utilized in suspending the screen from the window casing. The hinge is then secured to the frame of the screen by driving the fastening elements through the openings 13 in the screen body. With the parts thus arranged, it is apparent that the screen can be swung from its pivot inwardly of the window frame.

While it is believed that from the foregoing description, the nature and advantages of the invention will be readily apparent, I desire to have it understood that I do not limit myself in this connection, and that such changes may be resorted to when desired as fall within the scope of what is claimed.

Having thus described my invention what I claim is:—

As a new article of manufacture, a one-piece screen hinge comprising a flat body portion, parallel flanges projecting at right angles from the longitudinal edges of the body portion to straddle one side edge of a screen, and arms extending inwardly from the inner ends of said flanges and forming continuations thereof and resting at right angles to the body and the flanges to bear on the upper edge of a screen; the body being apertured at points between the flanges, and being extended beyond the arm-bearing ends of the flanges and provided in its extended portion with an aperture.

In testimony whereof I affix my signature.

JOSEPH B. BRADLEY.